(12) United States Patent
Chen et al.

(10) Patent No.: US 7,880,446 B2
(45) Date of Patent: Feb. 1, 2011

(54) ADAPTIVE FREQUENCY COMPENSATION FOR DC-TO-DC CONVERTER

(75) Inventors: Lu Chen, San Jose, CA (US); Bruno Ferrario, Cupertino, CA (US)

(73) Assignee: Vishay-Siliconix, Santa Clara, CA (US)

( * ) Notice: Subject to any disclaimer, the term of this patent is extended or adjusted under 35 U.S.C. 154(b) by 568 days.

(21) Appl. No.: 11/352,031

(22) Filed: Feb. 10, 2006

(65) Prior Publication Data

US 2006/0176098 A1 Aug. 10, 2006

Related U.S. Application Data

(60) Provisional application No. 60/652,232, filed on Feb. 10, 2005.

(51) Int. Cl.
*H01M 10/46* (2006.01)

(52) U.S. Cl. ..................... 320/166

(58) Field of Classification Search ............... 320/109, 320/166, 167; 323/268, 312, 313, 315
See application file for complete search history.

(56) References Cited

U.S. PATENT DOCUMENTS

| | | | |
|---|---|---|---|
| 3,654,116 A * | 4/1972 | Inoue | ............ 205/641 |
| 4,333,050 A * | 6/1982 | Yeasting | ............ 361/90 |
| 4,831,381 A | 5/1989 | Hester | |
| 5,055,991 A | 10/1991 | Carroll et al. | |
| 5,377,091 A | 12/1994 | Faulk | |
| 5,465,011 A | 11/1995 | Miller et al. | |
| 5,596,265 A | 1/1997 | Wrathall et al. | |
| 5,616,945 A | 4/1997 | Williams | |
| 5,844,403 A | 12/1998 | Sugimoto et al. | |
| 5,973,367 A | 10/1999 | Williams | |
| 6,031,702 A | 2/2000 | Williams | |
| 6,104,231 A | 8/2000 | Kirkpatrick | |
| 6,107,870 A | 8/2000 | Kawano | |
| 6,154,017 A | 11/2000 | Contreras | |
| 6,191,565 B1 | 2/2001 | Lee et al. | |
| 6,430,070 B1 | 8/2002 | Shi et al. | |
| 6,577,180 B2 | 6/2003 | Liu | |
| 7,098,637 B2 | 8/2006 | Jauregui et al. | |
| 2004/0240238 A1 | 12/2004 | Jauregui et al. | |

FOREIGN PATENT DOCUMENTS

DE 3627858 2/1988
DE 3912849 11/1989

(Continued)

OTHER PUBLICATIONS

PCT International Search Report, mailed Jul. 20, 2006, International Application No. PCT/US2006/004811, VISHAY-SILICONIX et al., 10 pages.

(Continued)

*Primary Examiner*—Edward Tso

(57) ABSTRACT

One embodiment of the invention is a compensation circuit that includes a comparator that is coupled to receive a reference voltage. The compensation circuit can also include a capacitance coupled to receive a feedback voltage associated with an output voltage of a converter. Furthermore, the compensation circuit can include an adjustable resistance that is coupled to the capacitance and to the comparator.

20 Claims, 12 Drawing Sheets

FOREIGN PATENT DOCUMENTS

| | | |
|---|---|---|
| DE | 4118918 | 12/1992 |
| EP | 0291157 A2 | 11/1988 |
| EP | 0498917 | 8/1992 |
| JP | 59-204468 | 11/1984 |
| JP | 61-133816 | 8/1986 |
| JP | S63-135881 | 6/1988 |
| JP | 2-074149 | 3/1990 |
| JP | H3-210611 | 9/1991 |
| JP | H10-014229 | 1/1998 |
| JP | 2004-343997 | 12/2004 |
| KR | 10-1996-0005199 | 4/1996 |
| KR | 10-2000-0020856 | 4/2000 |
| KR | 10-0333973 B1 | 4/2002 |
| KR | 10-2003-0066422 | 8/2003 |

OTHER PUBLICATIONS

Translation of an Office Action of Japan Patent Office; Mailing Date: May 26, 2009; Patent Application No.: 2007-552420;JP.

Non-Final Office Action Dated Mar. 13, 2010; U.S. Appl. No. 12/571,194;.CON.

Notice of Allowance Dated Jul. 26, 2010; U.S. Appl. No. 12/571,194; CON.

Non-Final Office Action Dated Mar. 16, 2010; U.S. Appl. No. 12/571,194; CON.

Notice of Allowance Dated Nov. 12, 2010; U.S. Appl. No. 12/571,194; CON.

* cited by examiner

US 7,880,446 B2

ADAPTIVE FREQUENCY COMPENSATION FOR DC-TO-DC CONVERTER

CROSS REFERENCE TO RELATED APPLICATIONS

This patent application claims the benefit of U.S. Provisional Patent Application No. 60/652,232 entitled "Adaptive Frequency Compensation For DC-to-DC Converter" by Lu Chen et al., filed on Feb. 10, 2005, which is assigned to the assignee of the present application and is hereby incorporated by reference.

BACKGROUND

Within electronic circuitry, a direct current to direct current (DC-DC) voltage-mode boost converter circuit can be utilized as a voltage supply for other circuitry. It is appreciated that a DC-DC voltage-mode boost converter circuit typically receives an input voltage at one value and generates an output voltage having a value greater than or equal to the input voltage. It is desirable that the DC-DC voltage-mode boost converter circuit provides a stable output voltage so that the circuitry connected to it can operate properly. However, there are disadvantages associated with conventional DC-DC voltage-mode boost converter circuits.

For example, when the load current of the DC-DC voltage-mode boost converter circuit changes quickly, it can cause the output voltage of the DC-DC voltage-mode boost converter to become unstable or transient for a period of time. Unfortunately, the time it takes the output voltage of the DC-DC voltage-mode boost converter to return to its stable value can be slow (known as its transient response). Therefore, the slow transient response can cause circuitry connected to the DC-DC voltage-mode boost converter to not operate properly. Additionally, the DC-DC voltage-mode boost converter is a negative feedback loop system, wherein there is a 180-degree phase shift at DC conditions. At higher frequency, reactive components and time delays can adversely cause extra time shifts within the DC-DC voltage-mode boost converter.

One conventional solution for trying to solve these disadvantages is to implement a compensation circuit, such as compensation circuit 1200 of FIG. 12, in the loop of the DC-DC voltage-mode boost converter, which guarantees enough phase margin by limiting the gain and crossover frequency of the loop. Unfortunately, the compensation circuit 1200 usually adversely limits the loop speed of the transient response. The compensation circuit 1200 is usually composed of fixed-value resistors 1206 and 1208 and fixed-value capacitors 1202 and 1204, which values are usually determined based upon worst-case input, output, and load conditions. As such, in normal operating conditions, the phase margin can be much more than needed, thereby resulting in the speed of the loop load transient or line transient being slow.

Therefore, it would be desirable to address one or more of the above disadvantages.

SUMMARY

One embodiment of the invention is a compensation circuit that can include a comparator that is coupled to receive a reference voltage. The compensation circuit can also include a capacitance coupled to receive a feedback voltage associated with an output voltage of a converter. Furthermore, the compensation circuit can include an adjustable resistance or impedance that is coupled to the capacitance and to the comparator.

Another embodiment of the invention provides a compensation circuit that can include a comparator coupled to receive a reference voltage. Additionally, the compensation circuit can include a capacitance coupled to receive a feedback voltage associated with an output voltage of a converter. Moreover, the compensation circuit can include an adjustable capacitance coupled to the capacitance.

Yet another embodiment of the invention provides a method that includes establishing an adjustable resistance (or impedance) or capacitance of a compensation circuit at an upper value. A determination can be made as to whether a transient feedback voltage exceeds a predefined range. It is noted that the transient feedback voltage can be associated with an output voltage of a converter circuit. The adjustable resistance or capacitance can be established at a lower value, in response to the transient feedback voltage exceeding the predefined range.

While particular embodiments of the present invention have been specifically described within this summary, it is noted that the invention is not limited to these embodiments. The invention is intended to cover alternatives, modifications and equivalents, which may be included within the scope of the invention as construed according to the Claims.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
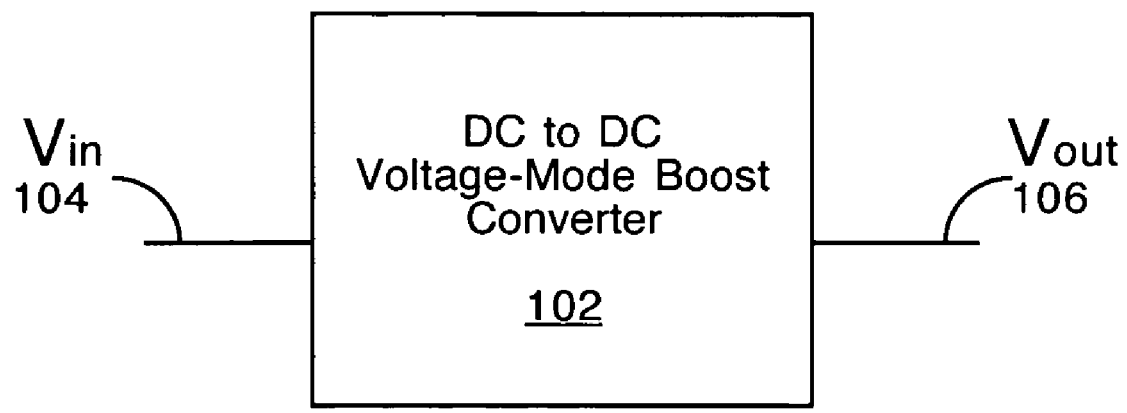
FIG. 1 is a block diagram of a DC-DC voltage-mode boost converter in accordance with various embodiments of the invention.

FIG. 1 is a block diagram of a direct current to direct current (DC-DC) voltage-mode boost converter 102 in accordance with various embodiments of the invention. It is understood that the DC-DC voltage-mode boost converter 102 receives an input voltage ($V_{in}$) 104 and converts it into an output voltage ($V_{out}$) 106 having a value greater than or equal to the value of the input voltage 104. It is noted that the DC-DC voltage-mode boost converter 102 tries to maintain the output voltage 106 at a constant voltage value.

Figure 2:
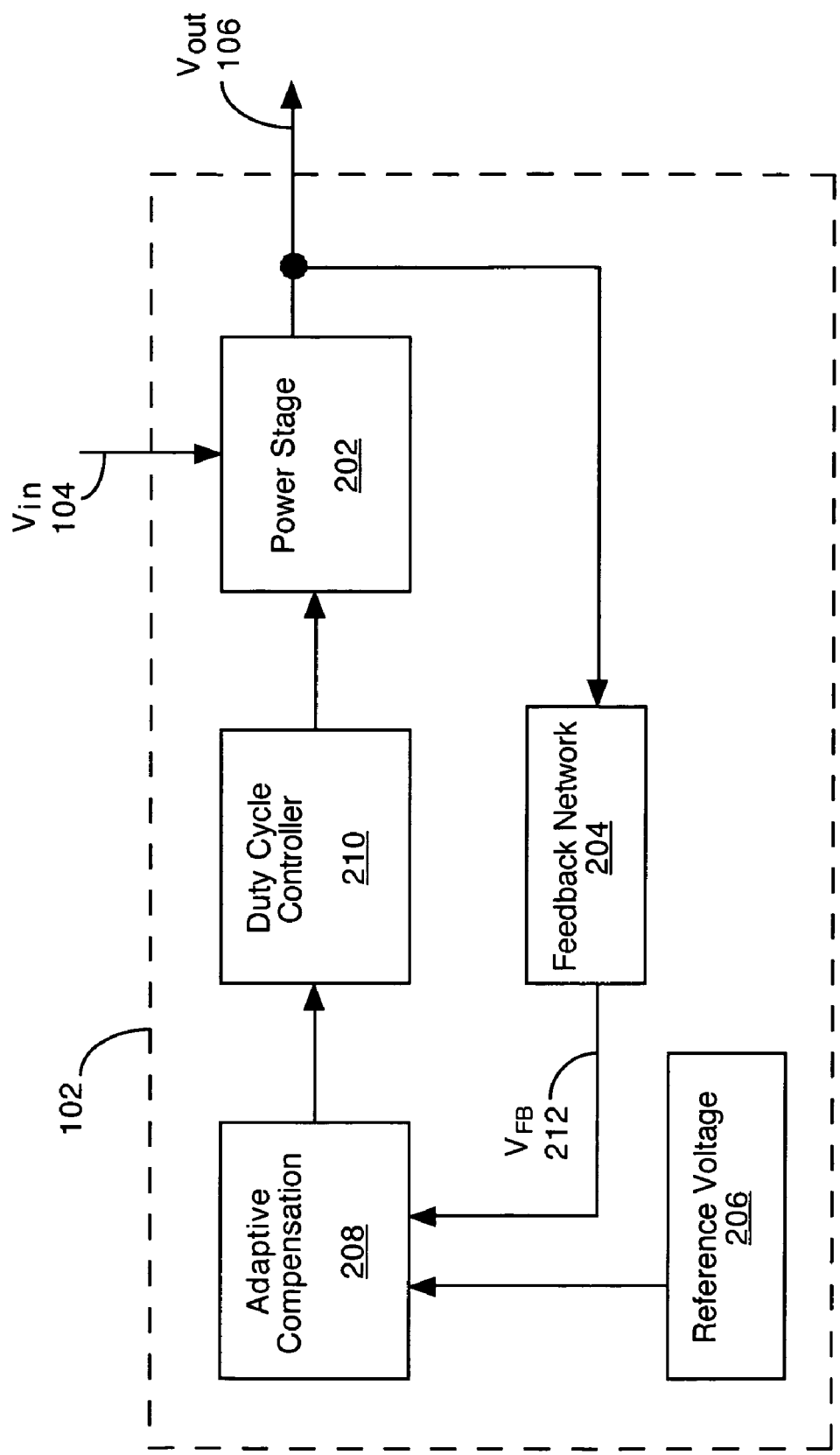
FIG. 2 is an exemplary block diagram of the DC-DC voltage-mode boost converter or buck converter in accordance with various embodiments of the invention.

FIG. 2 is a block diagram of exemplary components or modules that can be included within the DC-DC voltage-mode boost converter 102 in accordance with various embodiments of the invention. Furthermore, converter 102 also shows the exemplary components or modules that can be included within a DC-DC voltage-mode buck converter in accordance with various embodiments of the invention. Note that the DC-to-DC voltage-mode boost converter 102 can include a negative feedback loop system, wherein there can be a 180-degree phase shift at DC conditions.

The DC-to-DC converter system 102 can include, but is not limited to, an adaptive compensation module 208, a duty cycle controller module 210, a power stage module 202, a feedback network 204, and a reference voltage 206. The power stage module 202 can be implemented in a wide variety of ways. For example, the power stage module 202 can include, but is not limited to, one or more inductors, one or more capacitors, one or more diodes, and one or more power switches. Moreover, the power stage 202 can be implemented to include, but is not limited to, any combination of one or more of the previously recited elements. It is noted that the power stage 202 can be controlled by the duty cycle controller 210 and can convert the input voltage 104 into the output voltage 106.

Within FIG. 2, the output voltage 106 can be received by the feedback network 204, which can generate a feedback voltage ($V_{FB}$) 212 that can be received by adaptive compensation module 208. The adaptive compensation 208 can compare the feedback voltage 212 with the received reference voltage 206. It is understood that the output of the adaptive compensation module 208 can control the generation of the duty cycle within the DC-DC voltage-mode boost converter 102. In accordance with various embodiments, the adaptive compensation 208 can include, but is not limited to, capacitors and resistors, among other elements.

A transient of the output voltage 106 can be caused within the DC-DC voltage-mode boost converter 102 by variations of the input voltage 104 and/or changes in a loading current. When a transient of the output voltage 106 occurs, the output voltage 106 changes. If the change of the transient is large enough to move the feedback voltage 212 outside of a predefined range or threshold, the adaptive compensation 208 can be triggered enabling it to modify the loop transfer function, which results in the loop response speed being faster and the feedback voltage 212 can also return faster to the value of the reference voltage 206.

Within FIG. 2, an output of the adaptive compensation module 208 can be coupled to an input of the duty cycle controller 210. An output of the duty cycle controller 210 can be coupled to a first input of the power stage 202. A second input of the power stage module 202 can be coupled to receive the input voltage 104 while an output of the power stage 202 can be coupled to an input of the feedback network 204. It is appreciated that the output of the power stage 202 can also be an output for the DC-DC voltage-mode boost converter 102 that outputs the output voltage 106. And output of the feedback network 204 can be coupled to be received by the adaptive compensation module 208. The adaptive compensation module 208 can also be coupled to receive the reference voltage 206.

Note that additional elements or components can be included as part of boost converter or buck converter system 102. Moreover, less elements or components can be utilized within converter 102. In various embodiments, the operations described with reference to converter 102 can be performed automatically and without any interaction by a user of converter 102. Understand that the operations described with reference to converter 102 can be performed by software, by firmware, by electronic hardware, or by any combination thereof.

Figure 3:
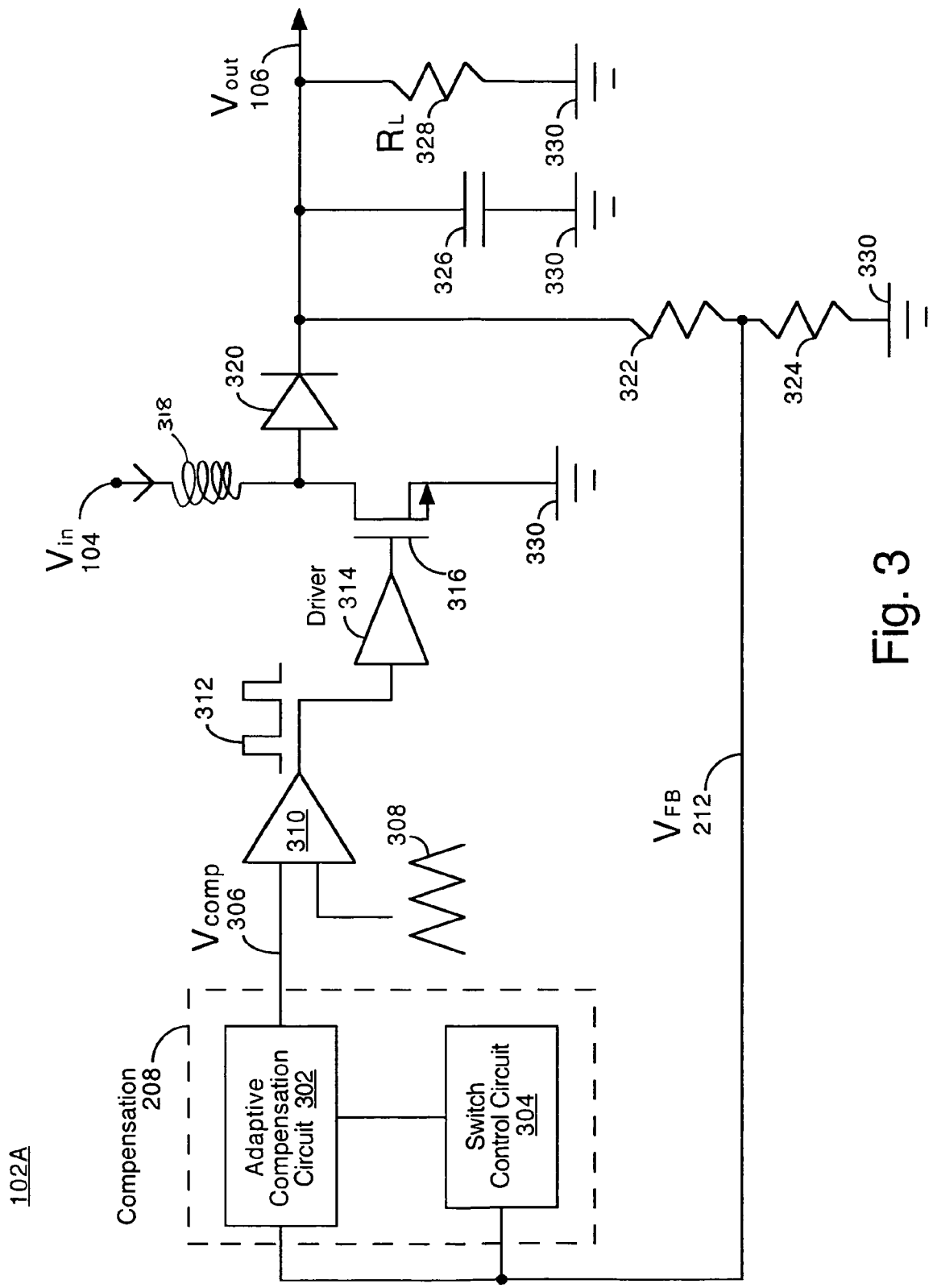
FIG. 3 is a schematic diagram of an exemplary DC-DC voltage-mode boost converter in accordance with various embodiments of the invention.

FIG. 3 is a schematic diagram of an exemplary DC-DC voltage-mode boost converter circuit 102A in accordance with various embodiments of the invention. It is noted that the DC-DC voltage-mode boost converter 102A can be an implementation embodiment of the DC-DC voltage-mode boost converter 102 of FIG. 2. For example, the adaptive compensation module 208 of the DC-DC voltage-mode boost converter 102A can include an adaptive compensation circuit 302 and a switch control circuit 304, but is not limited to such. Note that the adaptive compensation circuit 302 and the switch control circuit 304 can each be coupled to receive the feedback voltage 212 in order to monitor and regulate transients of the output voltage 106.

It is appreciated that comparator 310 and driver 314 can be components that comprise the duty cycle controller (e.g., 210) of the DC-DC voltage-mode boost converter 102A. Furthermore, an inductor 318, a diode 320, a transistor 316, a capacitor 326, and a load resistor 328 can be components that comprise the power stage (e.g., 202) of the DC-DC voltage-mode boost converter 102A. Moreover, resistors 322 and 324 along with the coupling between the output of diode 320 and each input of the adaptive compensation circuit 302 and the switch control circuit 304 can be components that comprise the feedback network (e.g., 204) of the DC-DC voltage-mode boost converter 102A. Note that the reference voltage 206 can be received by both the adaptive compensation circuit 302 and the switch control circuit 304, but is not currently shown.

Within FIG. 3, the input voltage 104 can be received and output by inductor 318 to an input of diode 320 and a drain of transistor 316. The output of diode 320 can also produce the output voltage 106 of the DC-DC voltage-mode boost converter 102A. Note that resistors 322 and 324 form a voltage divider that produce the feedback voltage 212, which is a fraction of output voltage 106. The switch control circuit 304 can utilize the reference voltage 206 (FIG. 2) in order to detect or determine when a transient of the feedback voltage 212 has exceeded a predefined range. If the change of the transient is large enough to move the feedback voltage 212 outside of the predefined range (or threshold), the switch control circuit 304 can enable the adaptive compensation circuit 302 to modify the loop transfer function, which results in the output of voltage compensation signal ($V_{comp}$) 306.

The voltage compensation signal 306 can be received by a comparator circuit 310, which can compare the voltage compensation signal 306 with an input triangle waveform signal 308. As a result, the comparator 310 can generate a pulse width modulation signal 312, which can be received by driver circuit 314. In response to receiving the pulse width modulation signal 312, the driver 314 can produce an output signal that is received by the gate of transistor 316, thereby causing transistor 316 to be turned on and off. In this manner, the duty cycle of transistor (or switch) 316 can be controlled, which results in control of the output voltage 106. Note that each time transistor 316 is turned on, a current flows through inductor 318. However, when transistor 316 is switched off, the current within inductor 318 cannot change instantaneously. As such, energy that is within inductor 318 can be transferred to capacitor 326 via diode 320.

Within FIG. 3, a first terminal of the inductor 318 can be coupled to receive input voltage 104 while a second terminal of inductor 318 can be coupled to the drain of transistor 316 and to an input of diode 320. An output of diode 320 can be coupled to a first terminal of resistor 322, a first terminal of capacitor 326, a first terminal of the resistor load 328, and can also produce the output voltage 106. A second terminal of resistor 322 can be coupled to a first terminal of resistor 324, an input to the adaptive compensation circuit 302, and an input to the switch control circuit 304. Note that feedback voltage 212 can be transmitted to the adaptive compensation circuit 302 and the switch control circuit 304 from the coupling of the second terminal of resistor 322 and the first terminal of resistor 324. One or more outputs of the switch control circuit 304 can be coupled to one or more inputs of the adaptive compensation circuit 302. An output of the adaptive compensation circuit 302 can be coupled to a first input of the comparator 310 while a second input of comparator 310 can be coupled to receive the triangular waveform signal 308. An output of comparator 310 can be coupled to an input of the driver circuit 314. An output of the driver 314 can be coupled to the gate of transistor 316 while the source of transistor 316 and its substrate can each be coupled to ground 330. A second terminal of resistor 324, a second terminal of capacitor 326, and a second terminal of the resistor load 328 can each be coupled to ground 330.

Note that additional elements or components can be included as part of boost converter system 102A. Moreover, less elements or components can be utilized within boost converter 102A. In various embodiments, the operations described with reference to boost converter 102A can be performed automatically and without any interaction by a user of boost converter 102A. Understand that the operations described with reference to boost converter 102A can be performed by software, by firmware, by electronic hardware, or by any combination thereof.

Figure 4:
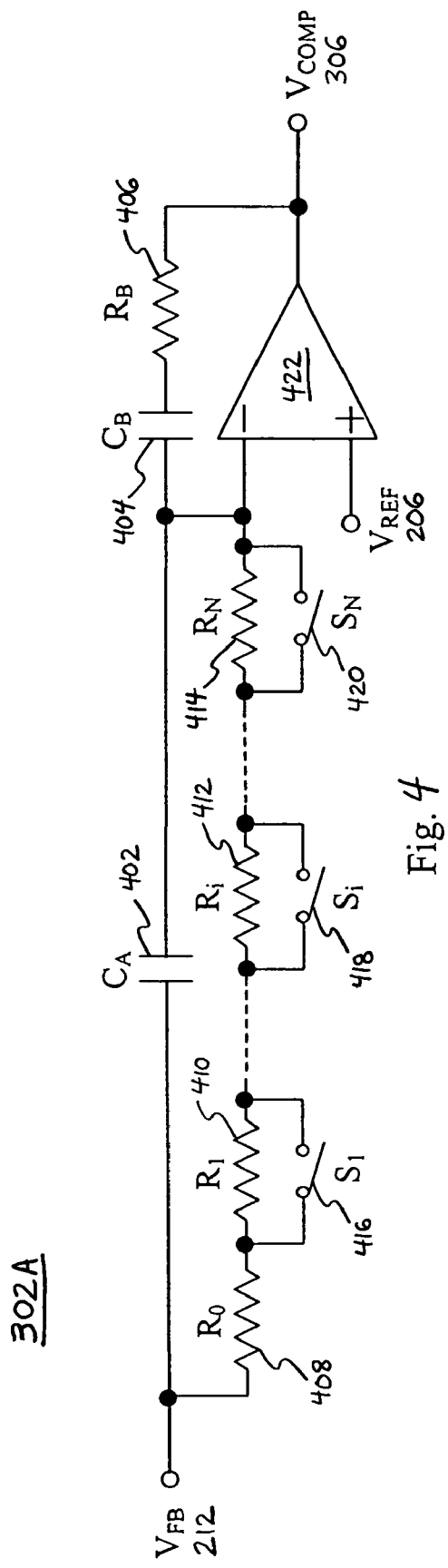
FIG. 4 is a schematic diagram of an exemplary adaptive compensation circuit in accordance with various embodiments of the invention.

FIG. 4 is a schematic diagram of an exemplary adaptive compensation circuit 302A in accordance with various embodiments of the invention. When a transient occurs to the output voltage 106, the switch control circuit 304 (FIG. 3) can vary the impedance (or resistance) of the adaptive compensation circuit 302A in real-time across the transient in order to decrease the transient response time of the DC-DC voltage-mode boost converter 102A.

It is noted that for a voltage-mode boost converter (e.g., 102A), its power stage can have double poles and a right half plane (RHP) zero. As such, the adaptive compensation circuit 302A can be used to provide compensation for the DC-DC voltage-mode boost converter 102A. It is noted that Equation 1 can represent the gain of the adaptive compensation circuit 302A:

$$\frac{V_{comp}(s)}{V_{FB}(s)} = \frac{-(1+sR_AC_A)(1+sR_BC_B)}{sR_AC_B} \quad (1)$$

wherein $R_A$ can be equal to the value of the resistance (or impedance) of resistors 408 ($R_0$), 410 ($R_1$), 412 ($R_i$) and 414 ($R_N$), depending on whether switches 416 ($S_1$), 418 ($S_i$), and 420 ($S_N$) are opened or closed. Within the adaptive compensation circuit 302A, the value of $R_A$ can be split into N+1 resistors (e.g., $R_0, R_1, \ldots, R_N$), wherein resistors 410-414 can be coupled in parallel with switches 416-420, respectively, as shown. It is appreciated that the operations of switches 416-420 can be controlled by the switch control circuit 304 (FIG. 3).

Within FIG. 4, for the steady state condition of the adaptive compensation circuit 302A, all of switches 416-420 can be turned off (or opened) by the switch control circuit 304, thereby resulting in:

$$\sum_{j=0}^{N} R_j = R_A$$

and a stable system. However, if a transient happens at output voltage 106 and its effect is large enough to cause the feedback voltage 212 to move beyond or outside of a predefined range, all of switches 416-420 can be turned on (or closed) thereby resulting in $R_A$ being equal to the resistance of resistor 408 ($R_0$). And according to Equation 1 shown above, as $R_A$ decreases, the magnitude of the gain of the adaptive compensation circuit 302A increases. As such, the adaptive compensation circuit 302A can respond faster to the transient by causing the feedback voltage 212 to return more quickly to the value of the reference voltage 206, which causes the output voltage 106 to return to its steady state value more quickly. Moreover, in order to maintain stability within the adaptive compensation circuit 302A, switches 416-420 can be gradually be turned off (or opened) from switch 416 ($S_1$) through switch 420 ($S_N$).

Figure 5:
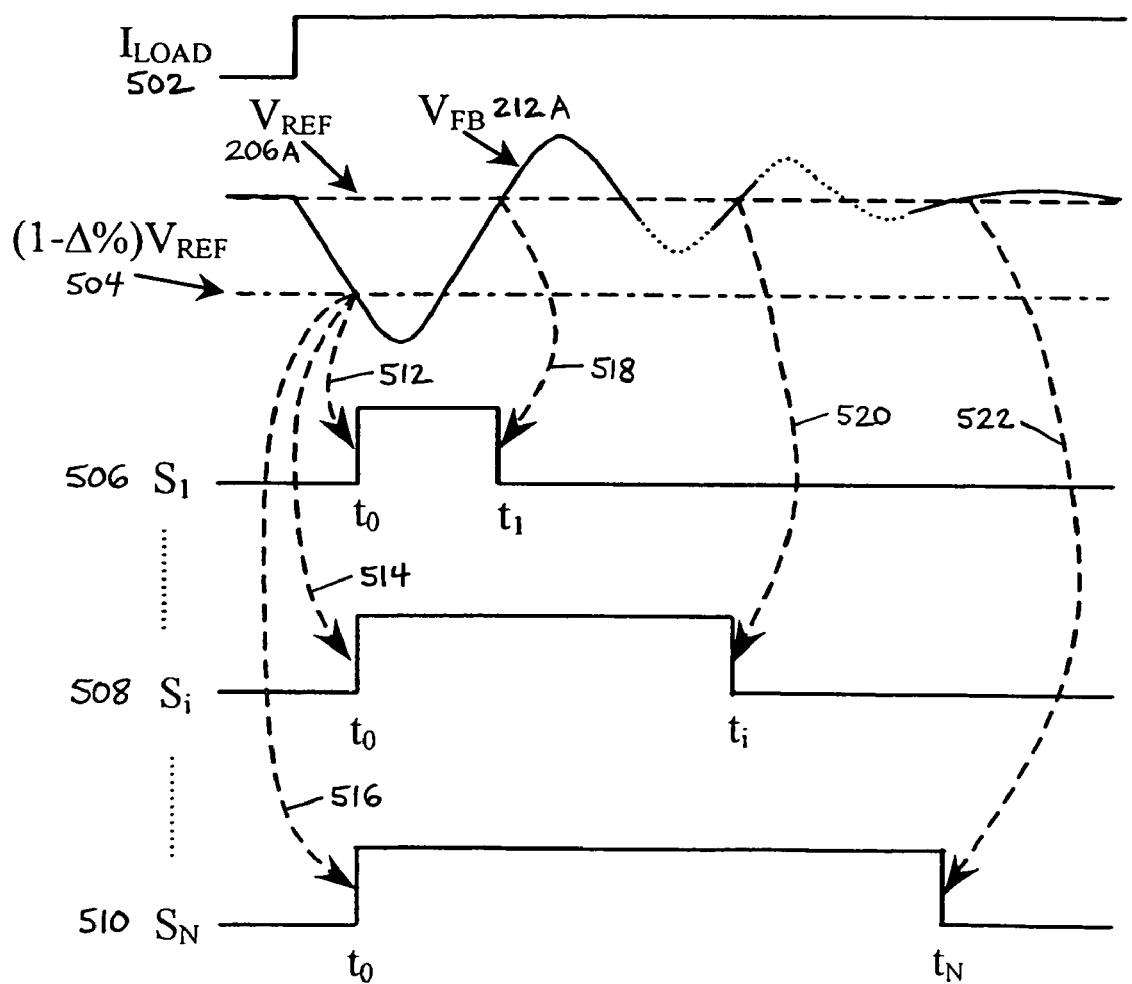
FIG. 5 is an exemplary timing diagram in accordance with various embodiments of the invention.

In order to describe the operations of the adaptive compensation circuit 302A of FIG. 4 in more detail, FIG. 5 will be described in conjunction with the adaptive compensation circuit 302A. FIG. 5 is an exemplary timing diagram 500 in accordance with various embodiments of the invention that illustrates a transient associated with a feedback voltage 212A when a load current 502 increases from a lower level to a higher level. Specifically, timing diagram 500 illustrates when the switches 416-420 can be turned on or off in response to a transient associated with feedback voltage 212A.

Within FIG. 5, it is noted that initially the value of the feedback voltage 212A is substantially equal to the value of the reference voltage 206A. However, when the load current 502 increases from a lower level to a higher level, a transient occurs to the output voltage 106, which can cause the value of the feedback voltage 212A to drop below the value of the reference voltage 206A. If the transient to the output voltage 106 is large enough, it can cause the feedback voltage 212A to drop below a $(1-\Delta\%)V_{REF}$ threshold 504 at $t_0$. Once the feedback voltage 212A crosses the value of the $(1-\Delta\%)V_{REF}$ threshold 504 at $t_0$, all of switches 416, 418 and 420 of the adaptive compensation circuit 302A (FIG. 4) can be shut or closed at substantially the same time as indicated by arrows 512, 514 and 516.

Specifically, signals 506, 508 and 510 at $t_0$ can each represent the signals output by the switch control circuit 304 (FIG. 3) to close or turn on each of switches 416, 418 and 420, respectively. As such, exemplary signals 506-510 are each changed at $t_0$ from a lower voltage level to a higher voltage level in order to turn on or shut switches 416, 418 and 420 of the adaptive compensation circuit 302A. Therefore, the resistance of $R_A$ of the adaptive compensation circuit 302A will substantially be equal to the resistance (or impedance) of resistor 408, thereby decreasing the resistance of $R_A$. Note that by reducing the value of $R_A$ within Equation 1, the transfer function (or gain) associated with the adaptive compensation circuit 302A becomes larger, which can cause the feedback voltage 212A to return more quickly to the value of the reference voltage 206A. However, at the same time the transfer function (or gain) is larger, compensation system 302A may not be stable, which might cause the feedback voltage 212A to have a large overshot past the reference voltage 206A.

As such, within FIG. 5, once the feedback voltage 212A returns to cross the reference voltage 206A for the first time at time $t_1$, a switch (e.g., 416) of the adaptive compensation circuit 302A (FIG. 4) can be turned off or opened (as indicated by arrow 518), thereby adding more impedance (e.g., resistor 410) to the value of $R_A$, which can make the compensation system 302A more stable. Specifically, exemplary signal 506 is changed at $t_1$, from a higher voltage level to a lower voltage level in order to turn off or open switch 416 of the adaptive compensation circuit 302A. In a similar manner, when the feedback voltage 212A crosses the reference voltage 206A the next odd time (or count or occurrence) at time $t_i$, the $i^{th}$ switch $S_i$ (e.g., 418) of the compensation system 302A can be turned off or opened (as indicated by arrow 520) when exemplary signal 508 is changed from a higher voltage level to a lower voltage level. Finally, when the feedback voltage 212A crosses the reference voltage 206A the next odd time (or count or occurrence) at time $t_N$, the $N^{th}$ switch $S_N$ (e.g., 420) can be turned off or opened (as indicated by arrow 522) when exemplary signal 510 is changed from a higher voltage level to a lower voltage level. In this manner, the resistance or impedance of $R_A$ of the compensation system 302A can be progressively increased while the feedback voltage 212A returns to the value of the reference voltage 206A. Therefore, the feedback voltage 212A can return to the reference voltage 206A faster (or more quickly) while achieving stability within the compensation system 302A.

It is appreciated that the operation of switches 416-420 of the adaptive compensation circuit 302A by the switch control circuit 304 can be similar for the condition when the load current 502 decreases from a higher level to a lower level, thereby resulting in a transient to the output voltage 106 causing the feedback voltage 212A to exceed above a (1+Δ%) $V_{REF}$ threshold (not shown). Noted that depending on the application of the adaptive compensation circuit 302A, the (1−Δ%)$V_{REF}$ threshold 504 and the (1+Δ%)$V_{REF}$ threshold can each be implemented in a wide variety of ways. For example, the delta percentage (Δ%) can be 2.5%, but is not limited to such.

Within FIG. 4, it is understood that simulation can be utilized in order to determine each resistance or impedance value for resistors 408, 410, 412 and 414. In one embodiment, note that the proper resistance value for resistor 408 ($R_0$) prevents the feedback voltage 212A from crossing both the lower threshold (1−Δ%)$V_{REF}$ 504 and the upper threshold (1+Δ%)$V_{REF}$ in response to a single transient occurrence. In this manner, the oscillation of the feedback voltage 212A can be avoided. Furthermore, the impedance value of resistor 410 ($R_1$) can be smaller than the impedance of 408 ($R_0$). For example in one embodiment, the impedance of resistor 410 ($R_1$) can be approximately one half the impedance of 408 ($R_0$). Moreover, each subsequent resistor from resistor 410 through resistor 414 can be implemented with an impedance smaller than its previous adjacent resistor. For example in one embodiment, each subsequent impedance value of resistors 410-414 can be approximately half that of the previous adjacent resistor.

Within the adaptive compensation system 302A of FIG. 4, a first terminal of the capacitor 402 can be coupled to receive the feedback voltage 212 and can be coupled to a first terminal of the resistor 408. A second terminal of resistor 408 can be coupled to a first terminal of the switch 416 and a first terminal of the resistor 410. A second terminal of the resistor 410 can be coupled to a second terminal of the switch 416. The second terminal of resistor 410 and the second terminal of switch 416 can also be coupled to a first terminal of another resistor, such as, resistor 412 and to a first terminal of another switch, such as, switch 418. A second terminal of resistor 412 can be coupled to a second terminal of switch 418. The second terminal of resistor 412 and the second terminal of switch 418 can also be coupled to a first terminal of another resistor, such as, resistor 414 and to a first terminal of another switch, such as, switch 420. A second terminal of resistor 414 can be coupled to a second terminal of switch 420, a second terminal of capacitor 402, a first input of amplifier 422, and a first terminal of the capacitor 404. A second input of the amplifier 422 can be coupled to receive the voltage reference 206. A second terminal of capacitor 404 can be coupled to a first terminal of the resistor 406 while a second terminal of resistor 406 can be coupled to an output of amplifier 422. It is understood that the output of amplifier 422 can output the compensation voltage 306 of the adaptive compensation circuit 302A.

Note that $R_A$ of the adaptive compensation circuit 302A can be implemented with any number of resistors and switches similar to resistors 410-414 and switches 416-420, respectively. Additionally, $R_A$ of the adaptive compensation circuit 302A can be implemented with just resistors 408 and 410 along with switch 416. As such, the second terminal of resistor 410 can be coupled to the second terminal of switch 416, the second terminal of capacitor 402, the first input of amplifier 422, and the first terminal of the capacitor 404. In this manner, $R_A$ of the adaptive compensation circuit 302A can be substantially equal to the impedance of resistor 408 or the combined impedance of resistors 408 and 410. However, it is appreciated that $R_A$ of the adaptive compensation circuit 302A can be implemented in a wide variety of ways, wherein its impedance can be dynamically modified, adjusted, varied or changed. Note that $R_A$ can be referred to as the adjustable resistance (or impedance) of the adaptive compensation circuit 302A.

Within FIG. 4, it is noted that additional elements or components can be included as part of the adaptive compensation system 302A. Moreover, less elements or components can be utilized within adaptive compensation 302A. In various embodiments, the operations described with reference to adaptive compensation 302A can be performed automatically and without any interaction by a user. Understand that the operations described with reference to adaptive compensation 302A can be performed by software, by firmware, by electronic hardware, or by any combination thereof.

Figure 6:
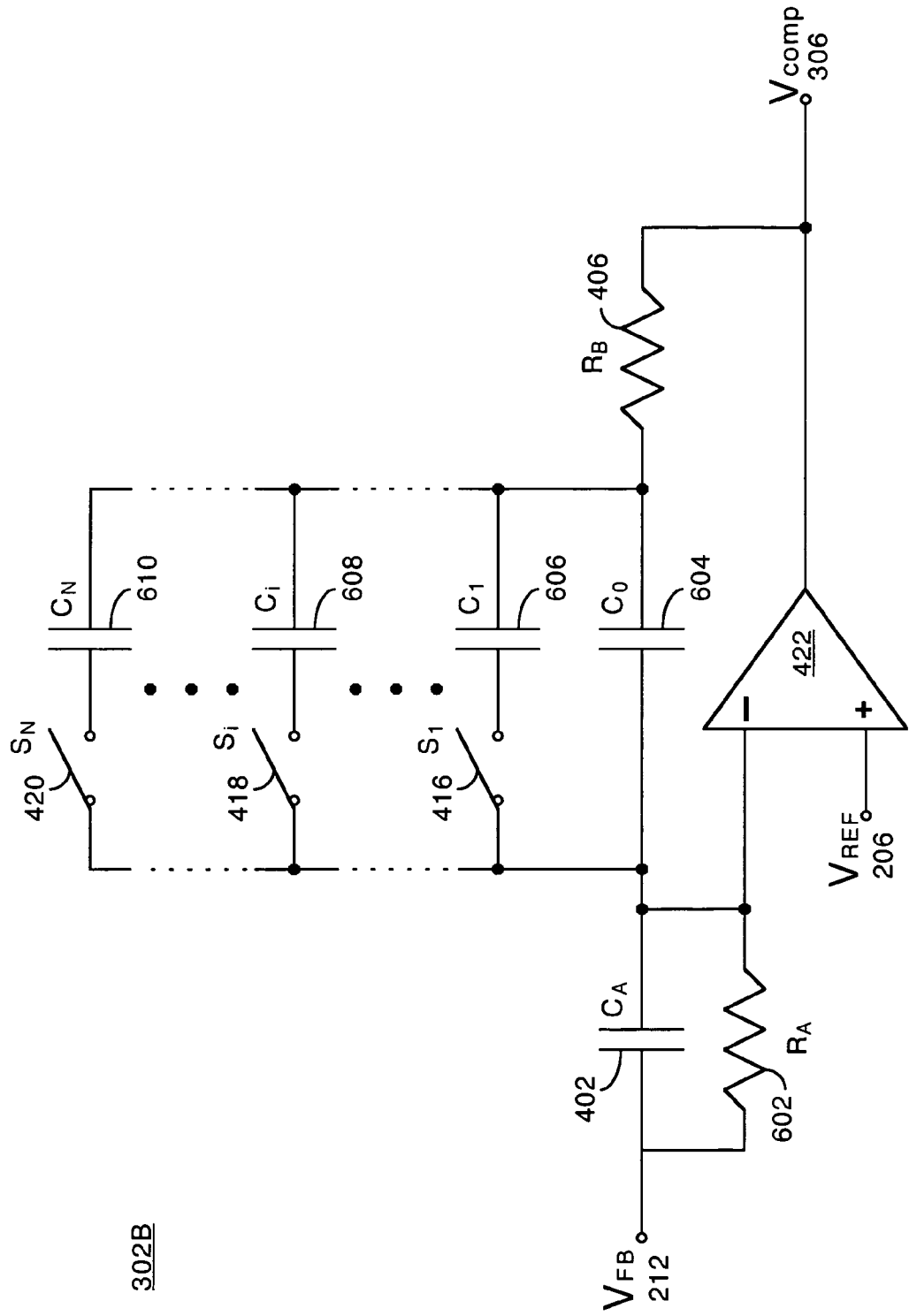
FIG. 6 is a schematic diagram of another exemplary adaptive compensation circuit in accordance with various embodiments of the invention.

FIG. 6 is a schematic diagram of an exemplary adaptive compensation circuit 302B in accordance with various embodiments of the invention. Note that the adaptive compensation circuit 302B of FIG. 6 operates in a manner similar to the adaptive compensation circuit 302A of FIG. 4. However, when a transient occurs to output voltage 106, the switch control circuit 304 (FIG. 3) can vary the capacitance of the adaptive compensation circuit 302B of FIG. 6 in real-time across a transient in order to decrease the transient response time of the DC-DC voltage-mode boost converter 102A. Specifically, in response to a transient at output voltage 106, the switch control circuit 304 can dynamically increase and decrease the capacitance of $C_B$ (e.g., $C_0$, $C_1$, $C_i$ and $C_N$) of the adaptive compensation circuit 302B. Therefore, the feedback voltage 212 can return to the reference voltage 206 faster (or more quickly) while achieving stability within the compensation system 302A.

Within the adaptive compensation circuit 302B, the value of $C_B$ can be split into N+1 capacitors (e.g., $C_0$, $C_1$, ..., $C_N$), wherein each of capacitors 604-610 can be coupled in series with each of switches 416-420, respectively, as shown. It is appreciated that for the steady state condition of the adaptive compensation circuit 302B, all of switches 416-420 can be turned on (or closed) by the switch control circuit 304, thereby resulting in the combined capacitance of capacitors 604 ($C_0$), 606($C_1$), 608 ($C_i$) and 610 ($C_N$):

$$\sum_{j=0}^{N} C_j = C_B$$

and a stable system.

In order to describe the operations of the adaptive compensation circuit 302B of FIG. 6 in more detail, FIG. 5 will be described in conjunction with the adaptive compensation circuit 302B. Within FIG. 5, it is noted that initially the value of the feedback voltage 212A is substantially equal to the value of the reference voltage 206A. However, when the load current 502 increases from a lower level to a higher level, a transient occurs to the output voltage 106, which can cause the value of the feedback voltage 212A to drop below the value of the reference voltage 206A. If the transient to the output voltage 106 is large enough, it can cause the feedback voltage 212A to drop below the $(1-\Delta\%)V_{REF}$ threshold 504 at $t_0$. Once the feedback voltage 212A crosses the value of the $(1-\Delta\%)V_{REF}$ threshold 504 at $t_0$, all of switches 416, 418 and 420 of the adaptive compensation circuit 302B (FIG. 6) can be opened or turned off at substantially the same time as indicated by arrows 512, 514 and 516.

Specifically, signals 506, 508 and 510 at $t_0$ can each represent the signals output by the switch control circuit 304 (FIG. 3) to opened or turned off each of switches 416, 418 and 420, respectively. As such, exemplary signals 506-510 are each changed at $t_0$ from a lower voltage level to a higher voltage level in order to turn on or shut switches 416, 418 and 420 of the adaptive compensation circuit 302B. Therefore, the capacitance of $C_B$ of the adaptive compensation circuit 302B will substantially be equal to the capacitance of capacitor 604, thereby decreasing the capacitance of $C_B$. Note that by reducing the value of $C_B$ within Equation 1, the transfer function (or gain) associated with the adaptive compensation circuit 302B becomes larger, which can cause the feedback voltage 212A to return more quickly to the value of the reference voltage 206A. However, at the same time the transfer function (or gain) is larger, compensation system 302B may not be stable, which might cause the feedback voltage 212A to have a large overshot past the reference voltage 206A.

As such, within FIG. 5, once the feedback voltage 212A returns to cross the reference voltage 206A for the first time at time $t_1$, a switch (e.g., 416) of the adaptive compensation circuit 302B (FIG. 6) can be turned on or closed (as indicated by arrow 518), thereby adding more capacitance (e.g., capacitor 606) to the value of $C_B$, which can make the compensation system 302B more stable. Specifically, exemplary signal 506 is changed at $t_1$ from a higher voltage level to a lower voltage level in order to turn on or close switch 416 of the adaptive compensation circuit 302B. In a similar manner, when the feedback voltage 212A crosses the reference voltage 206A the next odd time (or count or occurrence) at time $t_i$, the $i^{th}$ switch $S_i$ (e.g., 418) of the compensation system 302A can be turned on or closed (as indicated by arrow 520) when exemplary signal 508 is changed from a higher voltage level to a lower voltage level. Finally, when the feedback voltage 212A crosses the reference voltage 206A the next odd time (or count or occurrence) at time $t_N$, the $N^{th}$ switch $S_N$ (e.g., 420) can be turned on or closed (as indicated by arrow 522) when exemplary signal 510 is changed from a higher voltage level to a lower voltage level. In this manner, the capacitance of $C_B$ of the compensation system 302B can be progressively increased while the feedback voltage 212A returns to the value of the reference voltage 206A. Therefore, the feedback voltage 212A can return to the reference voltage 206A faster (or more quickly) while achieving stability within the compensation system 302B.

It is understood that the operation of switches 416-420 of the adaptive compensation circuit 302B by the switch control circuit 304 can be similar for the condition when the load current 502 decreases from a higher level to a lower level, thereby resulting in a transient to the output voltage 106 causing the feedback voltage 212A to exceed above a $(1+\Delta\%)V_{REF}$ threshold (not shown). It is noted that depending on the application of the adaptive compensation circuit 302B, the $(1-\Delta\%)V_{REF}$ threshold 504 and the $(1+\Delta\%)V_{REF}$ threshold can each be implemented in a wide variety of ways. For example, the delta percentage ($\Delta\%$) can be 2.5%, but is not limited to such.

Within FIG. 6, understand that simulation can be utilized to determine each capacitive value for capacitors 604, 606, 608 and 610. In one embodiment, note that the proper capacitive value for capacitor 604 ($C_0$) prevents the feedback voltage 212A from crossing both the lower threshold $(1-\Delta\%)V_{REF}$ 504 and the upper threshold $(1+\Delta\%)V_{REF}$ in response to a single transient occurrence. In this manner, the oscillation of the feedback voltage 212A can be avoided. Furthermore, the capacitive value of capacitor 606 ($C_1$) can be smaller than the capacitive value of capacitor 604 ($C_0$). For example in one embodiment, the capacitance of capacitor 606 ($C_1$) can be approximately one half the capacitance of capacitor 604 ($C_0$). Moreover, each subsequent capacitor from capacitor 606 through capacitor 610 can be implemented with a capacitance smaller than its previous adjacent capacitor. For example in one embodiment, each subsequent capacitance value of capacitors 606-610 can be approximately half that of the previous adjacent capacitor.

Within the adaptive compensation system 302B of FIG. 6, a first terminal of the capacitor 402 can be coupled to receive the feedback voltage 212 and can be coupled to a first terminal of the resistor 602. A second terminal of resistor 602 can be coupled to a second terminal of capacitor 402, a first terminal of amplifier 422, a first terminal of a capacitor 604, a first terminal of switch 416, a first terminal of switch 418, and a first terminal of switch 420. Furthermore, a second terminal of the switch 416 can be coupled to a first terminal of capacitor 606 while a second terminal of the switch 418 can be coupled to a first terminal of capacitor 608. A second terminal of the switch 420 can be coupled to a first terminal of capacitor 610. Additionally, a second terminal of capacitor 610 can be coupled to a second terminal of capacitor 608, a second terminal of capacitor 606, a second terminal of capacitor 604, and a first terminal of resistor 406. A second terminal of resistor 406 can be coupled to an output of amplifier 422. It is appreciated that the output of amplifier 422 can output the compensation voltage 306 of the adaptive compensation circuit 302B.

Note that $C_B$ of the adaptive compensation circuit 302B can be implemented with any number of capacitors and switches similar to capacitors 606-610 and switches 416-420, respectively. Additionally, $C_B$ of the adaptive compensation circuit 302B can be implemented with just capacitors 604 and 606 along with switch 416. As such, the second terminal of capacitor 604 can be coupled to the second terminal of capacitor 606 and the first terminal of the resistor 406. In this manner, $C_B$ of the adaptive compensation circuit 302B can be substantially equal to the capacitance of capacitor 604 or the combined capacitance of capacitors 604 and 606. However, it is appreciated that $C_B$ of the adaptive compensation circuit 302B can be implemented in a wide variety of ways, wherein its capacitance can be dynamically modified, adjusted, varied or changed. Note that $C_B$ can be referred to as the adjustable capacitance of the adaptive compensation circuit 302B.

In accordance with various embodiments of the invention, note that the adjustable capacitance of $C_B$ of the adaptive compensation circuit 302B of FIG. 6 can be combined with the adjustable impedance (or resistance) of $R_A$ of the adaptive compensation circuit 302A of FIG. 4. In this manner, the switch control module 304 can dynamically control or adjust the capacitance of $C_B$ and/or the impedance of $R_A$ of such a combined adaptive compensation circuit.

Within FIG. 6, it is noted that additional elements or components can be included as part of the adaptive compensation system 302B. Moreover, less elements or components can be utilized within adaptive compensation 302B. In various embodiments, the operations described with reference to adaptive compensation 302B can be performed automatically and without any interaction by a user. Understand that the operations described with reference to adaptive compensation 302B can be performed by software, by firmware, by electronic hardware, or by any combination thereof.

Figure 7:
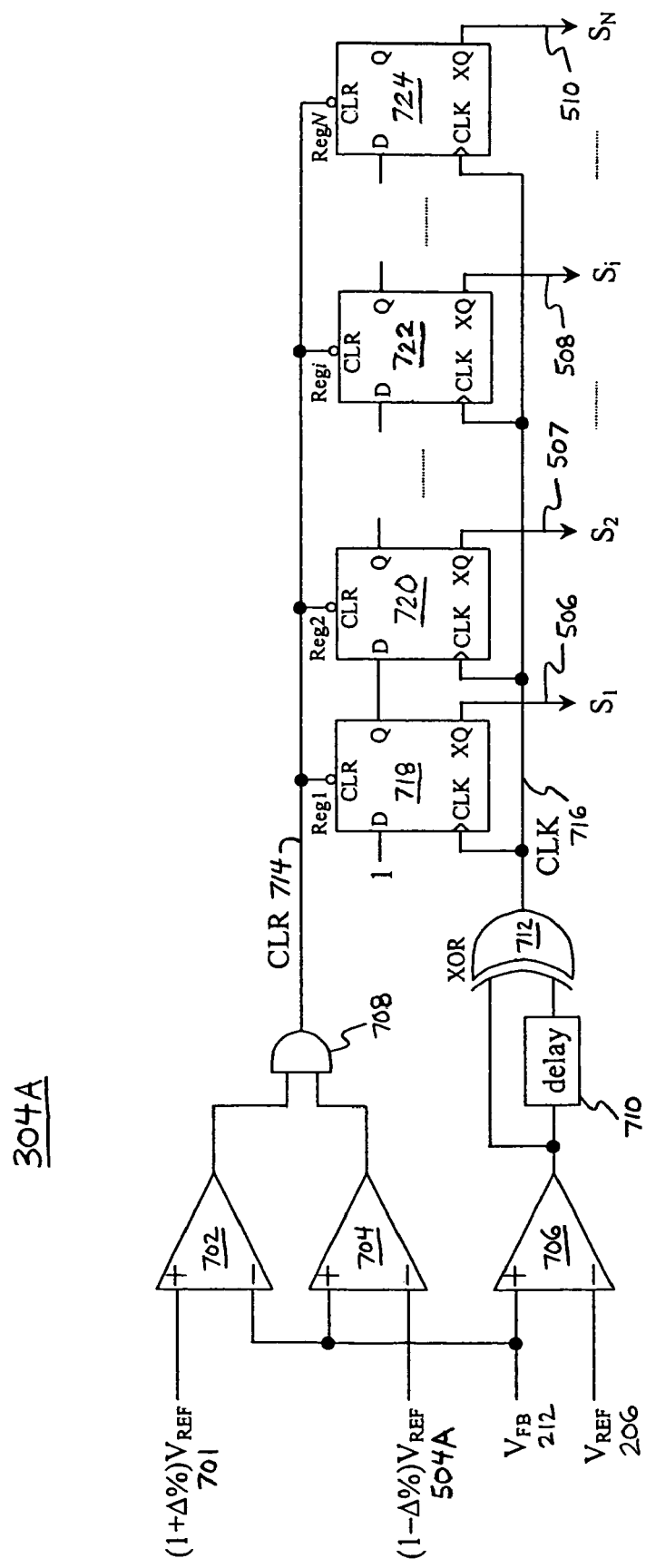
FIG. 7 is a schematic diagram of an exemplary switch control circuit in accordance with various embodiments of the invention.

FIG. 7 is a schematic diagram of an exemplary switch control circuit 304A in accordance with various embodiments of the invention. Note that the switch control circuit 304A can operate in any manner similar to that described herein in order to control the impedance of $R_A$ of the adaptive compensation circuit 302A of FIG. 4. Furthermore, the switch control circuit 304A can operate in any manner similar to that described herein in order to control the capacitance of $C_B$ of the adaptive compensation circuit 302B of FIG. 6. However, the switch control circuit 304A is not limited to those implementations.

When there is an increase of the load current (e.g., 502), the feedback voltage 212 may drop below $(1-\Delta\%)V_{REF}$ threshold 504A. As such, the switch control circuit 304A can include comparators 702 and 704 that are each coupled to receive the feedback voltage 212. Additionally, comparator 702 has $(1+\Delta\%)V_{REF}$ 701 as an input while comparator 704 has $(1-\Delta\%)V_{REF}$ 504A as one of its inputs. So once the feedback voltage 212 goes, for example, below the $(1-\Delta\%)V_{REF}$ threshold 504A, each of the outputs of comparators 702 and 704 can output a low voltage (e.g., logic zero), which are received by logic AND gate 708. The AND gate 708 outputs a clear (CLR) signal 714 having a low voltage (e.g., logic zero), which can cause the Q output of D flip-flop 718 to be a logic zero while its XQ output will produce a switch signal 506 that will be a logic one (e.g., a high voltage). Subsequently, it is noted that each XQ output of D flip-flips 720, 722 and 724 will produce switch signals 507, 508 and 510, respectively, which are each a logic one (e.g., a high voltage). Note that this voltage change of switch signals 506, 508 and 510 can be seen within exemplary signals 506, 508 and 510 of timing diagram 500 of FIG. 5.

Within FIG. 7, a comparator 706 can compare the reference voltage 206 and the feedback voltage 212 to determine each time the feedback voltage waveform 212 crosses the reference voltage 206. The signal output by the comparator 706 can be received by a delay circuit 710 and a logic XOR circuit 712 enabling the XOR gate 712 to generate a pulse, wherein the width of the pulse can be determined by the delay of the delay circuit 710. As such, each time the feedback voltage 212 crosses the reference voltage 206, the output pulse signal from the XOR 712 can be used as a clock (CLK) signal 716 for the D flip-flops 718-724.

Once the feedback voltage 212 crosses the reference voltage 206 for the first time, the data (D) input of the D flip-flop 718 is a logic one (e.g., a high voltage), its Q output will go to a logic one or high and its XQ will go to a logic zero or low, thereby causing the switch signal 506 ($S_1$) to go from a high to a low voltage. However, note that the other switch signals 507 ($S_2$), 508 ($S_i$) and 510 ($S_N$) do not change of the D flip-flops 720-724, respectively. And when the feedback voltage 212 crosses the voltage reference 206 for the next odd number of times, the switch control circuit 304A can generate a second CLK pulse 716, and then the logic one at the Q output of D flip-flop 718 can be transferred to the D input of the D flip-flop 720. As such, the Q output of the D flip-flop 720 can go to a logic one or high voltage and its XQ output can go to a logic zero or low voltage, thereby causing the switch signal 507 ($S_2$) to go from a high to a low voltage. With each similar type of crossing of the reference voltage 206 by the feedback voltage 212, more and more of the XQ outputs of the D flip-flops (e.g., 722 and 724) of the switch control circuit 304A can be changed from a high to a low voltage.

Within FIG. 7, it is noted that comparators 702 and 704 comprise a window comparator. As such, when the feedback voltage 212 reaches the delta percentage ($\Delta\%$) higher than the reference voltage $((1+\Delta\%)V_{REF})$ threshold 701 or the delta percentage lower than the reference voltage $((1-\Delta\%)V_{REF})$ threshold 504A, the clear signal 714 can be asserted at a logic zero and all of the D flip-flop registers 718-724 can be reset to zero. As such, the XQ output of D flip-flop registers 718-724 can go to a logic one, which can turn on all of switches 416-420 of the adaptive compensation circuit 302A (FIG. 4) or turn off all of switches 416-420 of the adaptive compensation circuit 302B (FIG. 6).

When the feedback voltage 212 crosses the reference voltage 206 for the first time, the output of comparator 706 will toggle, which can be received by the delay module 710 and the XOR gate 712. The XOR gate 712 can generate a clock signal 716, which controls the clock input of all of the D flip-flop registers 718-724. For example, the data input D of the D flip-flop register 718 can be coupled to a logic one (or high voltage). As such, when the clock signal 716 is received, the stored data at the Q output of the D flip-flop register 718 can change from a logic zero (or low voltage) to a logic one (or high voltage) while its XQ output can change the output switch signal 506 from a logic one to a logic zero. As such, the output switch signal 506 can, for example, turn off switch 416 of the adaptive compensation circuit 302A (FIG. 4) or turn on switch 416 of the adaptive compensation circuit 302B (FIG. 6). Note that for all of the D flip-flop registers 720-724, the data input D is coupled to the data output Q of the previous D flip-flop register. As such, when the feedback voltage 212 crosses the reference voltage 206 for the $i^{th}$ odd time, the output switch signal 508 can change from a logic one to a logic zero, which can, for example, turn off switch 418 of the adaptive compensation circuit 302A (FIG. 4) or turn on switch 418 of the adaptive compensation circuit 302B (FIG. 6). In this manner, the switches 416-420 of adaptive compensation circuits 302A and 302B can be controlled by the switch control circuit 304A, there maintaining stability within the adaptive compensation circuits 302A and 302B.

Within FIG. 7, a first input of the comparator 702 can be coupled to receive $(1+\Delta\%)V_{REF}$ threshold 701 while a second input of comparator 702 can be coupled to receive the feedback voltage 212. A first input of the comparator 704 can be coupled to receive $(1-\Delta\%)V_{REF}$ threshold 504A while a second input of comparator 704 can be coupled to receive the feedback voltage 212. An output of comparator 702 can be coupled to a first input of the AND gate 708 while an output of comparator 704 can be coupled to a second input of AND gate 708. The output of AND gate 708 (which can generate the clear signal 714) can be coupled to the clear (CLR) or reset input of each of the D Flip-Flops 718, 720, 722, and 724. A first input of the comparator 706 can be coupled to receive the feedback voltage 212 while a second input of comparator 706 can be coupled to receive the reference voltage 206. The output of comparator 706 can be coupled to an input of the delay circuit 710 and a first input of the XOR logic gate 712. The output of the delay circuit 710 can be coupled to a second input of the XOR gate 712. The output of the XOR gate 712 (which can generate the clock signal 716) can be coupled to the clock (CLK) input of each of the D Flip-Flops 718, 720, 722, and 724. The XQ output of D Flip-Flop 718 (which can generate the switch signal 506) can be coupled to control the operation of switch 416 of FIG. 4 and/or switch 416 of FIG. 6. The XQ output of D Flip-Flop 722 can be coupled to control the operation of switch 418 of FIG. 4 and/or switch 418 of FIG. 6. The XQ output of D Flip-Flop 724 can be coupled to control the operation of switch 420 of FIG. 4 and/or switch 420 of FIG. 6. It is noted that the XQ output of D Flip-Flop 720 can be coupled to control the operation of a switch (not shown) of the compensation circuit 302A or a switch (not shown) of the compensation circuit 302B.

Within FIG. 7, the switch control system 304A can be implemented with any number of D Flip-Flops similar to D Flip-Flops 718-724. Additionally, the switch control system 304A can be implemented with D Flip-Flop 718. It is noted that additional elements or components can be included as part of the switch control system 304A. Moreover, less elements or components can be utilized within switch control 304A. In various embodiments, the operations described with reference to switch control 304A can be performed automatically and without any interaction by a user. Understand that the operations described with reference to switch control system 304A can be performed by software, by firmware, by electronic hardware, or by any combination thereof.

Figure 8:
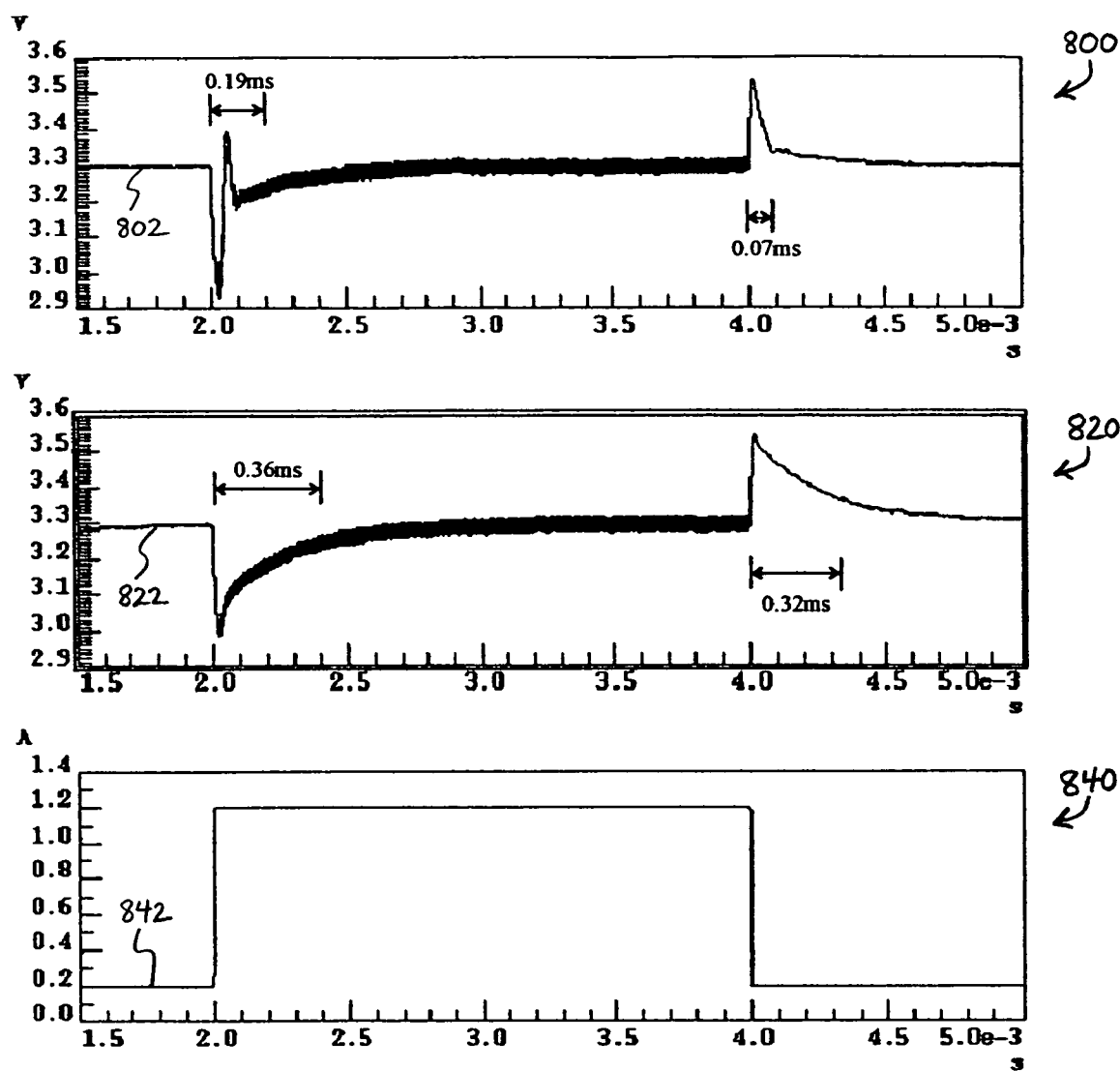
FIG. 8 includes graphs for comparing conventional art with various embodiments in accordance with the invention.

FIG. 8 illustrates load transient simulation results between a boost converter (e.g., 102A) with adaptive compensation (e.g., 208) in accordance with various embodiments of the invention and a boost converter without adaptive compensation for the same test conditions. Specifically, FIG. 8 includes a graph 840 that shows changes in a load current 842 that were applied to both a boost converter with adaptive compensation and a boost converter without adaptive compensation. As such, graph 800 of FIG. 8 shows an output voltage 802 from a boost converter with adaptive compensation in accordance with an embodiment of the invention along with the transients that were caused by the changes in load current 842. Furthermore, graph 820 of FIG. 8 shows an output voltage 822 from a boost converter without adaptive compensation along with the transients that were caused by the changes in load current 842.

As shown by graph 840, when load current 842 increases from 0.2 amperes (A) to 1.2 A at 2 milliseconds (ms), the output voltage 802 (within graph 800) of the boost converter with the adaptive compensation can respond with a transient time of approximately 0.19 ms. Conversely, within graph 820, the output voltage 822 of the boost converter without the adaptive compensation can respond with a transient time of approximately 0.36 ms. As such, the boost converter with adaptive compensation in accordance with an embodiment of the invention has a transient time that is approximately 1.8947 times faster than the boost converter without adaptive compensation. Therefore, a boost converter (e.g., 102A) with adaptive compensation (e.g., 208) in accordance with various embodiments of the invention is able to keep output voltage 802 more stable.

Moreover, as shown by graph 840, when load current 842 decreases from 1.2 A to 0.2 A at 4 ms, the output voltage 802 (within graph 800) of the boost converter with adaptive compensation in accordance with an embodiment of the invention can respond with a transient time of approximately 0.07 ms. Conversely, within graph 820, the output voltage 822 of the boost converter without adaptive compensation can respond with a transient time of approximately 0.32 ms. Therefore, the boost converter with adaptive compensation in accordance with an embodiment of the invention has a transient time that is approximately 4.5714 times faster than the boost converter without adaptive compensation. As such, a boost converter (e.g., 102A) with adaptive compensation (e.g., 208) in accordance with various embodiments of the invention is able to keep output voltage 802 more stable.

Within FIG. 8, it is noted that the X-axis of each of graphs 800, 820 and 840 indicates milliseconds. Furthermore, it is appreciated that the Y-axis of each of graphs 800 and 820 indicates voltage (V) values. Additionally, the Y-axis of graph 840 indicates electrical current in amperes (A).

Figure 9:
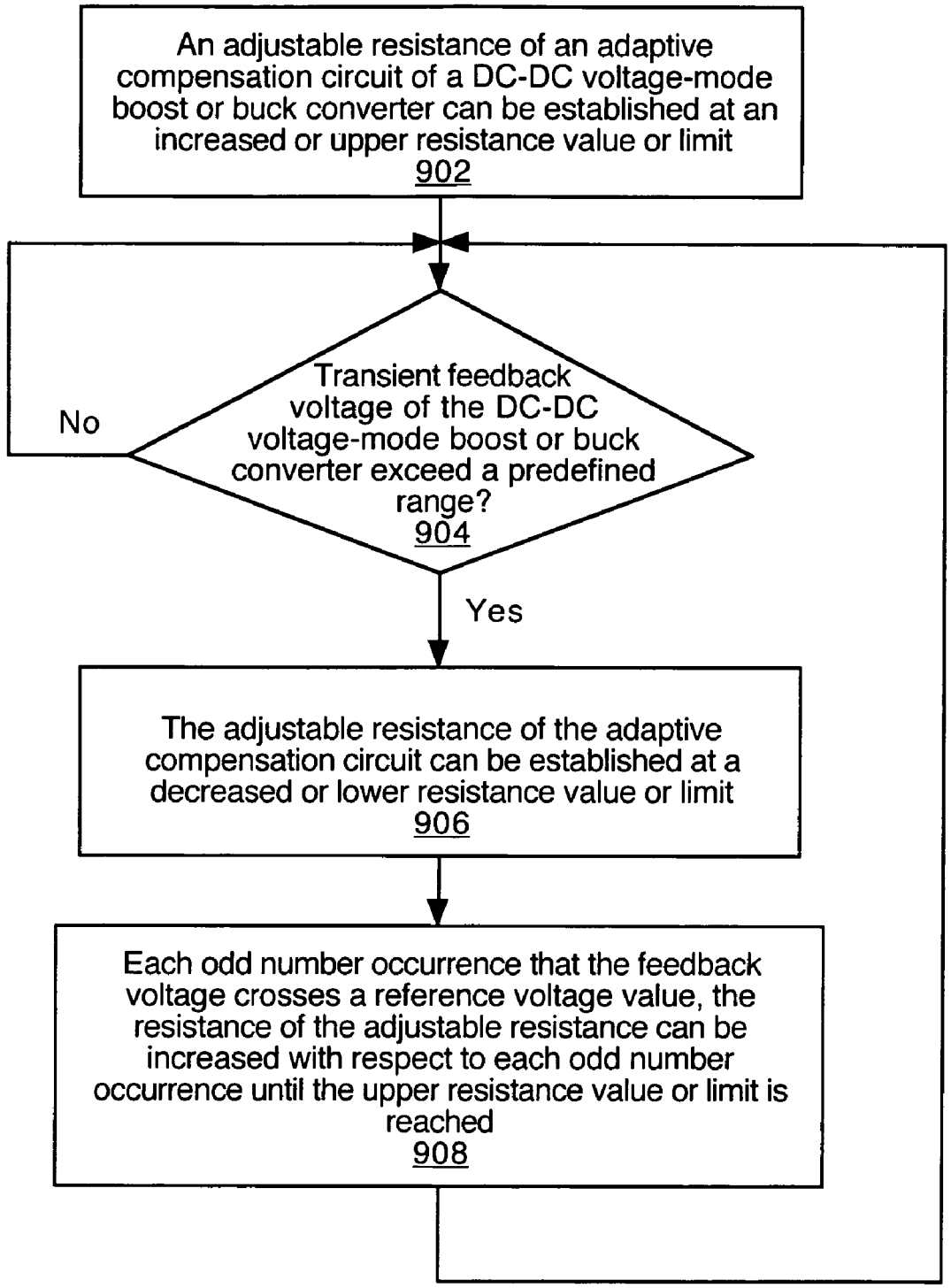
FIG. 9 is a flow diagram of a method in accordance with various embodiments of the invention.

FIG. 9 is a flow diagram of a method 900 in accordance with various embodiments of the invention for reducing the duration of an output voltage transient of a DC-DC voltage-mode boost or buck converter. Method 900 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 900, such operations are exemplary. Method 900 may not include all of the operations illustrated by FIG. 9. Also, method 900 may include various other operations and/or variations of the operations shown by FIG. 9. Likewise, the sequence of the operations of method 900 can be modified. It is noted that the operations of method 900 can be performed by software, by firmware, by electronic hardware, or by any combination thereof.

Specifically, an adjustable resistance of an adaptive compensation circuit of a DC-DC voltage-mode boost or buck converter can be established at an increased or upper resistance value or limit. A determination can be made as to whether a transient feedback voltage exceeds a predefined range. Note that the transient feedback voltage can be associated with a transient output voltage of the DC-DC voltage-mode boost or buck converter. If the transient feedback voltage does not exceed the predefined range, the determination can be repeated. However, once a transient feedback voltage exceeds the predefined range, the adjustable resistance (or impedance) of the adaptive compensation circuit can be established at a decreased or lower resistance value or limit. Subsequently, each odd number occurrence that the feedback voltage crosses a reference voltage value, the resistance of the adjustable resistance can be increased with respect to each odd number occurrence until the upper resistance value or limit is reached. Once the upper resistance value or limit is reached, process 900 can return to repeat the determination of whether a transient feedback voltage exceeds the predefined range. In this manner, the transient feedback voltage of the DC-DC voltage-mode boost or buck converter can more quickly return to the value of the voltage reference while maintaining stability within the system.

At operation 902 of FIG. 9, an adjustable resistance or impedance (e.g., $R_A$ of FIG. 4) of an adaptive compensation circuit (e.g., 302A) of a DC-DC voltage-mode boost or buck converter (e.g., 102A or 102B) can be established at an increased or upper resistance value or limit. It is noted that operation 902 can be implemented in a wide variety of ways. For example, operation 902 can be implemented in any manner similar to that described herein, but is not limited to such.

At operation 904, a determination can be made as to whether a transient feedback voltage (e.g., 212) exceeds a predefined range or threshold (e.g., 504 or 701). It is appreciated that the feedback voltage can be associated with an output voltage (e.g., 106) of the DC-DC voltage-mode boost or buck converter. If the transient feedback voltage does not exceed the predefined range at operation 904, process 900 can proceed to the beginning of operation 904 where it can be repeated. However, if it is determined at operation 904 that the transient feedback voltage exceeds the predefined range, process 900 can proceed to operation 906. It is understood that operation 904 can be implemented in a wide variety of ways. For example, operation 904 can be implemented in any manner similar to that described herein, but is not limited to such.

At operation 906 of FIG. 9, the adjustable resistance or impedance of the adaptive compensation circuit can be established at a decreased or lower resistance value or limit. It is appreciated that operation 906 can be implemented in a wide variety of ways. For example, operation 906 can be implemented in any manner similar to that described herein, but is not limited to such.

At operation 908, each odd number occurrence that the feedback voltage crosses or equals the value of a reference voltage (e.g., 206), the resistance of the adjustable resistance can be increased with respect to each odd number occurrence until the upper resistance value or limit is reached. Note that operation 908 can be implemented in a wide variety of ways. For example, operation 908 can be implemented in any manner similar to that described herein, but is not limited to such. Upon completion of operation 908, process 900 can proceed to operation 904. In this fashion, a transient feedback voltage associated with the output voltage of the DC-DC voltage-mode boost or buck converter can more quickly return to the value of the voltage reference while maintaining stability within the system.

Figure 10:
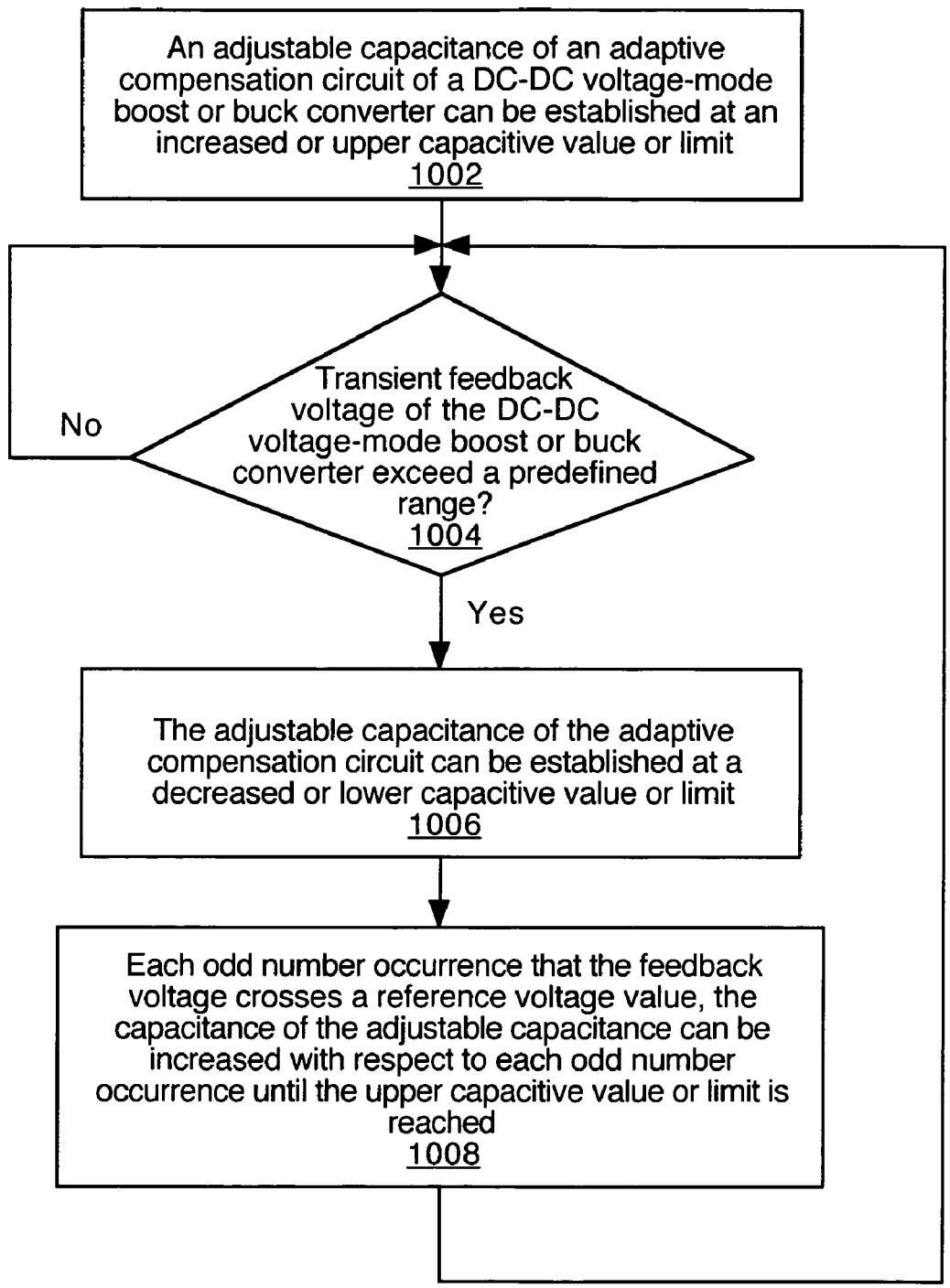
FIG. 10 is a flow diagram of another method in accordance with various embodiments of the invention.

FIG. 10 is a flow diagram of a method 1000 in accordance with various embodiments of the invention for reducing the duration of an output voltage transient of a DC-DC voltage-mode boost or buck converter. Method 1000 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 1000, such operations are exemplary. Method 1000 may not include all of the operations illustrated by FIG. 10. Also, method 1000 may include various other operations and/or variations of the operations shown by FIG. 10. Likewise, the sequence of the operations of method 1000 can be modified. It is noted that the operations of method 1000 can be performed by software, by firmware, by electronic hardware, or by any combination thereof.

Specifically, an adjustable capacitance of an adaptive compensation circuit of a DC-DC voltage-mode boost or buck converter can be established at an increased or upper capacitive value or limit. A determination can be made as to whether a transient feedback voltage exceeds a predefined range. Note that the transient feedback voltage can be associated with a transient output voltage of the DC-DC voltage-mode boost or buck converter. If the transient feedback voltage does not exceed the predefined range, the determination can be repeated. However, once a transient feedback voltage exceeds the predefined range, the adjustable capacitance of the adaptive compensation circuit can be established at a decreased or lower capacitive value or limit. Subsequently, each odd number occurrence that the feedback voltage crosses a reference voltage value, the capacitance of the adjustable capacitance can be increased with respect to each odd number occurrence until the upper capacitive value or limit is reached. Once the upper capacitive value or limit is reached, process 1000 can return to repeat the determination of whether a transient feedback voltage exceeds the predefined range. In this manner, the transient feedback voltage of the DC-DC voltage-mode boost or buck converter can more quickly return to the value of the voltage reference while maintaining stability within the system.

At operation 1002 of FIG. 10, an adjustable capacitance (e.g., $C_B$ of FIG. 6) of an adaptive compensation circuit (e.g., 302B) of a DC-DC voltage-mode boost or buck converter (e.g., 102A or 102B) can be established at an increased or upper resistance value or limit. It is noted that operation 1002 can be implemented in a wide variety of ways. For example, operation 1002 can be implemented in any manner similar to that described herein, but is not limited to such.

At operation 1004, a determination can be made as to whether a transient feedback voltage (e.g., 212) exceeds a predefined range or threshold (e.g., 504 or 701). The feedback voltage can be associated with an output voltage (e.g., 106) of the DC-DC voltage-mode boost or buck converter. If the transient feedback voltage does not exceed the predefined range at operation 1004, process 1000 can proceed to the beginning of operation 1004 where it can be repeated. However, if it is determined at operation 1004 that the transient feedback voltage exceeds the predefined range, process 1000 can proceed to operation 1006. It is understood that operation 1004 can be implemented in a wide variety of ways. For example, operation 1004 can be implemented in any manner similar to that described herein, but is not limited to such.

At operation 1006 of FIG. 10, the adjustable capacitance of the adaptive compensation circuit can be established at a decreased or lower capacitive value or limit. It is appreciated that operation 1006 can be implemented in a wide variety of ways. For example, operation 1006 can be implemented in any manner similar to that described herein, but is not limited to such.

At operation 1008, each odd number occurrence that the feedback voltage crosses or equals the value of a reference voltage (e.g., 206), the capacitance of the adjustable capacitance can be increased with respect to each odd number occurrence until the upper capacitive value or limit is reached. Note that operation 1008 can be implemented in a wide variety of ways. For example, operation 1008 can be implemented in any manner similar to that described herein, but is not limited to such. Upon completion of operation 1008, process 1000 can proceed to operation 1004. In this fashion, a transient feedback voltage associated with the output voltage of the DC-DC voltage-mode boost or buck converter can more quickly return to the value of the voltage reference while maintaining stability within the system.

Figure 11:
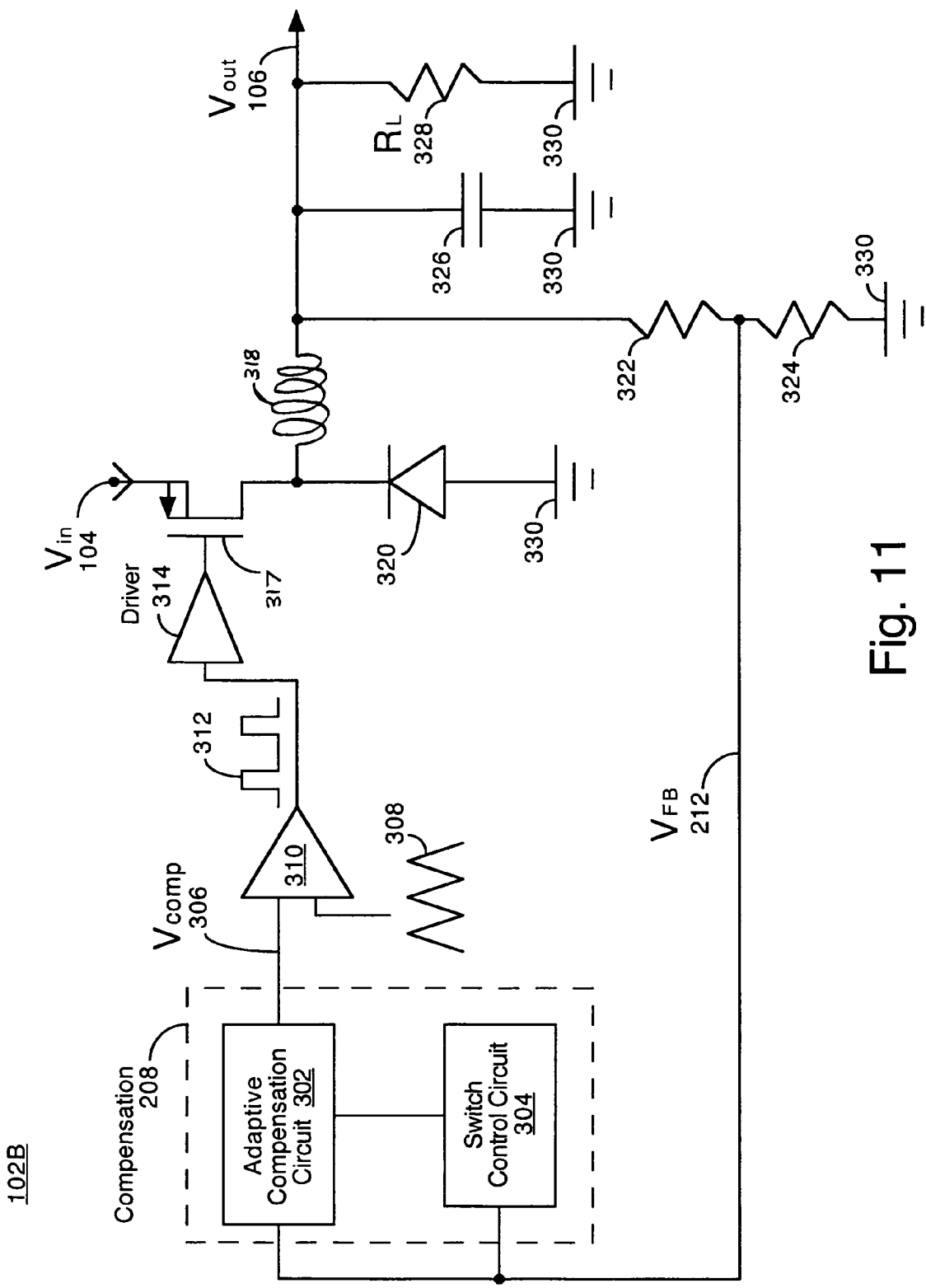
FIG. 11 is a schematic diagram of an exemplary DC-DC voltage-mode buck converter circuit in accordance with various embodiments of the invention.
Figure 12:
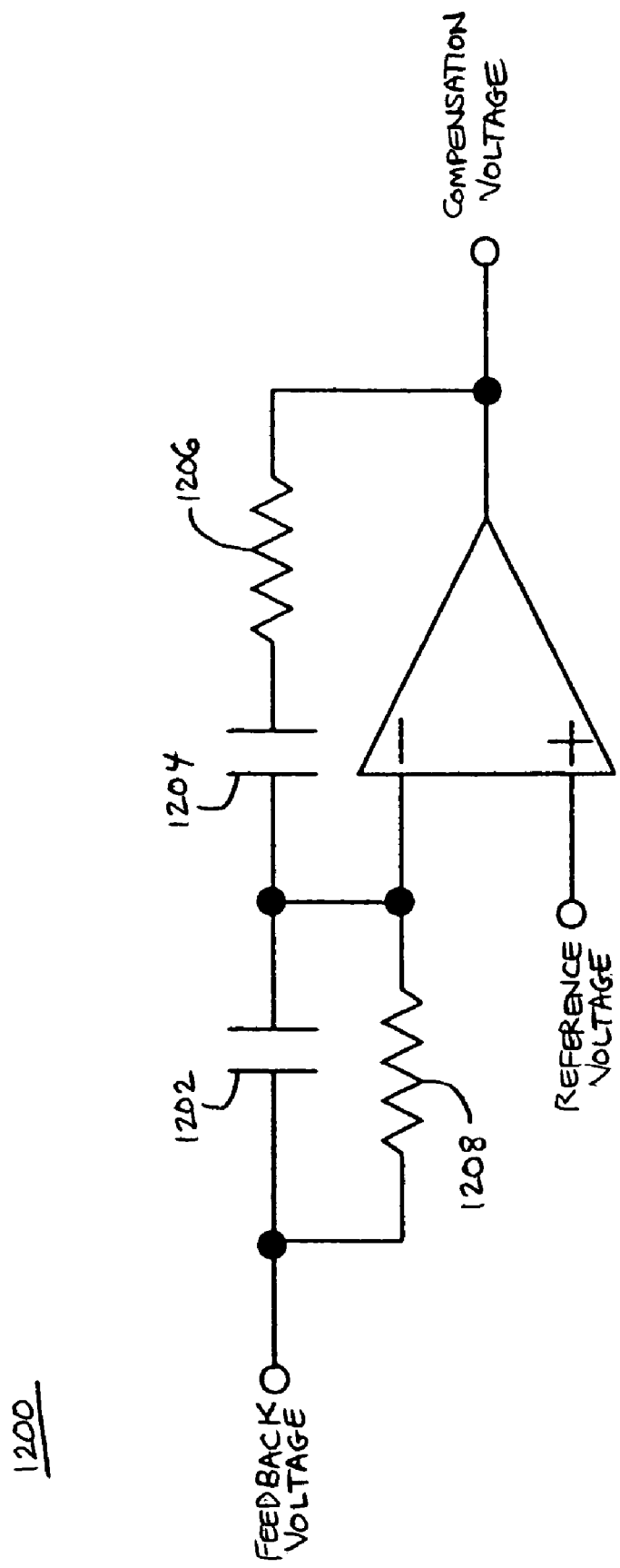
FIG. 12 is a schematic diagram of a conventional compensation circuit that can be implemented in the loop of a DC-DC voltage-mode boost converter circuit.

FIG. 11 is a schematic diagram of an exemplary DC-DC voltage-mode buck converter circuit 102B in accordance with various embodiments of the invention. It is noted that the DC-DC voltage-mode buck converter 102B can be an implementation embodiment of the converter 102 of FIG. 2. It is understood that the adaptive compensation circuit 302 and the switch control circuit 304 of the DC-DC voltage-mode buck converter 102B can operate in any manner similar to that described herein, but are not limited to such.

The DC-DC voltage-mode buck converter 102B of FIG. 11 can be coupled in a manner similar to the DC-DC voltage-mode boost converter 102A of FIG. 3. However, within DC-DC voltage-mode buck converter 102B of FIG. 11, the output of driver 314 can be coupled to the gate of a transistor 317. The source of transistor 317 and its substrate can be coupled to receive the input voltage 104 while the drain of transistor 317 can be coupled to an output of diode 320, and a first terminal of inductor 318. The input of diode 320 can be coupled to ground 330. A second terminal of inductor 318 can be coupled to the first terminal of resistor 322, the first terminal of capacitor 326, the first terminal of resistor load 328, and can also produce the output voltage 106.

Within FIG. 11, it is appreciated that inductor 318, diode 320, transistor 317, capacitor 326, and load resistor 328 can be components that comprise the power stage (e.g., 202) of the DC-DC voltage-mode buck converter 102B.

Note that additional elements or components can be included as part of buck converter system 102B. Moreover, less elements or components can be utilized within buck converter 102B. In various embodiments, the operations described with reference to buck converter 102B can be performed automatically and without any interaction by a user of buck converter 102B. Understand that the operations described with reference to buck converter 102B can be performed by software, by firmware, by electronic hardware, or by any combination thereof.

It is noted that each of transistors 316 and 317 can be implemented in a wide variety of ways in accordance with various embodiments of the invention. For example, transistor 317 can be implemented as, but is not limited to, a P-channel MOSFET (metal-oxide semiconductor field-effect transistor) which is also known as a PMOS or PFET. Furthermore, transistor 316 can be implemented as, but is not limited to, a N-channel MOSFET which is also known as a NMOS or NFET. It is noted that each of transistors 316 and 317 can be referred to as a switching element. Note that a gate, a drain, and a source of transistors 316 and 317 can each be referred to as a terminal of its transistor. Additionally, each gate of transistors 316 and 317 can also be referred to as a control terminal of its transistor.

It is understood that switches 416, 418 and 420 of various embodiments in accordance with the invention can be implemented in a wide variety of ways. For example, switches 416, 418 and 420 can each be implemented as a transistor, but is not limited to such.

Within various embodiments in accordance with the invention, it is appreciated that any resistance described herein may also be referred to as an impedance.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A compensation circuit comprising:
   a comparator coupled to receive a reference voltage;
   a first capacitance coupled to receive a feedback voltage associated with an output voltage of a converter; and
   an adjustable resistance coupled to said first capacitance and to said comparator.

2. The compensation circuit of claim 1, wherein said first capacitance is coupled in parallel with said adjustable resistance.

3. The compensation circuit of claim 2, further comprising:
   a second capacitance coupled in series with said first capacitance; and
   a resistance coupled in series with said second capacitance and coupled to an output of said comparator.

4. The compensation circuit of claim 1, further comprising:
   a control circuit coupled to change said adjustable resistance.

5. The compensation circuit of claim 1 wherein said compensation circuit is coupled to a duty cycle controller of said converter.

6. The compensation circuit of claim 5, wherein said duty cycle controller is coupled to a power stage of said converter.

7. The compensation circuit of claim 1, wherein said adjustable resistance comprises a plurality of resistors and a switch, said switch coupled to a resistor of said plurality of resistors.

8. A compensation circuit comprising:
   a comparator coupled to receive a reference voltage;
   a capacitance coupled to receive a feedback voltage associated with an output voltage of a converter; and
   an adjustable capacitance coupled to said capacitance.

9. The compensation circuit of claim 8, wherein said capacitance is coupled in parallel with a first resistance coupled to said comparator.

10. The compensation circuit of claim 9, further comprising:
    a second resistance coupled to said adjustable capacitance and an output of said comparator.

11. The compensation circuit of claim 8, further comprising:
    a control circuit coupled to change said adjustable capacitance.

12. The compensation circuit of claim 8, wherein said compensation circuit is coupled to a duty cycle controller of said converter.

13. The compensation circuit of claim 12, wherein said duty cycle controller is coupled to a power stage of said converter.

14. The compensation circuit of claim 8, wherein said adjustable capacitance comprises a plurality of capacitors and a switch, said switch coupled to a capacitor of said plurality of capacitors.

15. A method comprising:
establishing an adjustable resistance of a compensation circuit at an upper value;
determining whether a transient feedback voltage exceeds a predefined range, said transient feedback voltage is associated with an output voltage of a converter circuit; and
establishing said adjustable resistance at a lower value, in response to said transient feedback voltage exceeding said predefined range.

16. The method of claim 15, further comprising:
increasing said adjustable resistance to a higher value when said transient feedback voltage crosses a reference voltage value, after said transient feedback voltage exceeds said predefined range.

17. The method of claim 16, wherein said increasing is performed at each odd numbered occurrence that said transient feedback voltage crosses said reference voltage value.

18. The method of claim 17, wherein said increasing is performed until said upper value is reached.

19. The method of claim 15, wherein said compensation circuit is part of a buck converter or a boost converter.

20. The method of claim 15, wherein said predefined range is a delta percentage plus or minus said reference voltage.

* * * * *